United States Patent
Koch et al.

(10) Patent No.: US 10,041,596 B2
(45) Date of Patent: Aug. 7, 2018

(54) RADIAL SHAFT SEAL

(75) Inventors: Uwe Koch, Pliezhausen (DE); Martin Schuster, Leutenbach (DE); Walter Schuhmacher, Bietigheim-Bissingen (DE)

(73) Assignee: ElringKlinger AG, Dettingen (DE)

( * ) Notice: Subject to any disclaimer, the term of this patent is extended or adjusted under 35 U.S.C. 154(b) by 381 days.

(21) Appl. No.: 13/487,971

(22) Filed: Jun. 4, 2012

(65) Prior Publication Data

US 2012/0306160 A1    Dec. 6, 2012

(30) Foreign Application Priority Data

Jun. 6, 2011   (DE) .................. 10 2011 077 015

(51) Int. Cl.
| F16J 15/46 | (2006.01) |
| F16J 15/48 | (2006.01) |
| F16J 15/3228 | (2016.01) |

(52) U.S. Cl.
CPC ........... *F16J 15/46* (2013.01); *F16J 15/3228* (2013.01); *F16J 15/48* (2013.01)

(58) Field of Classification Search
CPC ........... F16J 15/46; F16J 15/3228; F16J 15/48
USPC ................ 277/551, 553, 556, 558, 583, 589
See application file for complete search history.

(56) References Cited

U.S. PATENT DOCUMENTS

| 2,133,487 | A | * | 10/1938 | James | 277/558 |
| 2,316,941 | A | * | 4/1943 | Dodge | 277/556 |
| 2,345,588 | A | * | 4/1944 | Dodge | 277/556 |
| 2,731,282 | A | | 1/1956 | McManus et al. | |
| 2,825,589 | A | | 3/1958 | Richardson et al. | |
| 3,138,942 | A | * | 6/1964 | Kayser | 464/131 |
| 3,306,620 | A | * | 2/1967 | Taschenberg | 277/553 |
| 3,337,222 | A | | 8/1967 | Smith et al. | |
| 3,443,814 | A | * | 5/1969 | Dahlheimer | 277/552 |
| 3,637,222 | A | | 1/1972 | Wilkinson | |
| 3,687,464 | A | * | 8/1972 | Jackson et al. | 277/553 |
| 4,377,312 | A | * | 3/1983 | Zackrisson | 384/485 |
| 4,706,970 | A | * | 11/1987 | Ramirez | 277/556 |
| 4,733,707 | A | * | 3/1988 | Goodell et al. | 152/417 |
| 5,149,106 | A | * | 9/1992 | Takenaka et al. | 277/556 |

(Continued)

FOREIGN PATENT DOCUMENTS

| DE | 22 29 862 A | 1/1974 |
| DE | 27 02 809 A1 | 8/1977 |
| WO | WO 2007111305 A1 * | 10/2007 |

*Primary Examiner* — Eugene G Byrd
(74) *Attorney, Agent, or Firm* — Womble Bond Dickinson (US) LLP

(57) ABSTRACT

A radial shaft seal is provided for sealing between high and low pressure sides in an annular space between a shaft and a static structural receiving part, wherein the shaft seal is rotationally symmetric and arranged coaxially to the shaft. A first sealing ring has an inner periphery bulging toward the low pressure side and forms a first sealing lip abutting the shaft. A spacer ring has first and second faces directed towards the high and low pressure sides, respectively. An elastic shaped part has an outer periphery abutting the second face of the spacer ring and an inner periphery bulging toward the high pressure side and abutting the first sealing lip. At least the spacer ring and elastic shaped part define a cavity subjected to the high pressure side or a control pressure which presses the first sealing lip against the shaft via the elastic shaped part.

19 Claims, 3 Drawing Sheets

(56) References Cited

U.S. PATENT DOCUMENTS

| | | |
|---|---|---|
| 6,886,834 B2 | 5/2005 | Osako et al. |
| 2009/0302548 A1* | 12/2009 | Ramsay ........................ 277/558 |
| 2010/0156050 A1 | 6/2010 | Heinrich et al. |
| 2010/0230905 A1 | 9/2010 | Iizuka et al. |

* cited by examiner

RADIAL SHAFT SEAL

CROSS-REFERENCE TO RELATED APPLICATION

This application claims priority from, and the benefit under 35 U.S.C. § 119, of German Patent Application No. 10 2011 077 015.1, filed Jun. 6, 2011, which is incorporated herein by reference in its entirety and for all purposes.

BACKGROUND OF THE INVENTION

The present invention relates to a radial shaft seal for sealing between a high pressure side and a low pressure side in an annular space between a shaft and a static structural part receiving the shaft, wherein the radial shaft seal is configured to be rotationally symmetric and is arranged coaxially to the shaft.

In a multiplicity of technical applications rotating shafts must be sealed in the region of their passage through a static structural part to prevent a fluid medium from passing undesirably from one side of the static structural part to the other. The radial shaft seals used for this purpose must meet especially high requirements in particular when different pressure conditions prevail on both sides, i.e., when sealing must occur between a high pressure side and a low pressure side. This concerns the use of radial shaft seals, for example, in turbines, motors or gears, wherein the medium subjected to pressure can be liquid as well as gaseous.

The simplest design of a radial shaft seal comprises a sealing ring with a sealing lip that abuts against the shaft and bulges in the direction of the high pressure side. The pressing of this sealing lip against the shaft occurs, inter alia, by directly subjecting it to pressure with the medium present, i.e., the contact pressure increases with the pressure difference between the two sides. In the case of very high pressures and in particular with a simultaneously high rotational speed of the shaft, the resulting friction heat can lead to increased wear and therefore to failure of the seal, i.e., both as a result of a thermal overload of the material of the sealing ring and of the medium subjected to pressure (e.g., carbonisation of oil).

In order to prevent the problem of the seal being pressed too strongly in the case of high pressures, so-called pressure-relieved radial shaft sealing rings are used according to the prior art. These have a sealing lip with a relatively small sealing surface, wherein the sealing lip is configured so that the resulting radial pressing of the sealing lip onto the shaft is substantially independent of the pressure conditions. To still assure a sufficient pressing, it is necessary to bias the sealing lip in this case by means of a resilient element, generally by means of an O ring made of an elastomeric material, wherein this in turn has the disadvantage that this constant biasing is also high at low rotational speeds or upon stoppage of the shaft, which leads to a jerky start-up of the shaft because of a high static friction. Also problematic is the friction of the sealing lip, which in corresponding operating conditions leads to a high thermal stress and thus to substantial wear of the seal.

Because of the specified disadvantages known radial shaft seals are not adequately wear-resistant or exhibit too high a friction for an application at high pressures and high rotational speeds, such as e.g. in the case of exhaust gas turbochargers for internal combustion engines.

Therefore, the object forming the basis of the invention is to propose an improved radial shaft seal with a low friction and a high wear-resistance.

SUMMARY OF THE INVENTION

This object is achieved according to the invention with the radial shaft seal of the aforementioned type in that the radial shaft seal comprises:
  (i) a first sealing ring made from a non-elastic plastic material, which in the region of its inner periphery bulges in the direction of the low pressure side and forms a first sealing lip abutting against the shaft,
  (ii) a spacer ring, which is arranged axially displaced relative to the first sealing ring in the direction of the low pressure side, with a first face directed towards the high pressure side and a second face directed towards the low pressure side, and
  (iii) an elastic shaped part, which in the region of its outer periphery abuts against the second face of the spacer ring and in the region of its inner periphery bulges in the direction of the high pressure side and abuts against the first sealing lip,
wherein between the spacer ring, the elastic shaped part and optionally the first sealing lip there is formed a cavity, which can be subjected to the pressure prevailing on the high pressure side or to a control pressure, in such a manner that as a result of the pressure application the first sealing lip is pressed against the shaft by means of the elastic shaped part.

In the radial shaft seal according to the invention the first sealing lip is subjected to pressure with the pressure prevailing on the high pressure side or with a corresponding control pressure, in order to balance the pressure present directly between the shaft and the first sealing lip to enable the first sealing lip to be pressed substantially constantly against the shaft substantially independently of the respective pressure difference between the two sides. It is particularly advantageous in this case that the equalising pressure prevailing in the cavity is transferred by means of the elastic shaped part at least partially indirectly to the first sealing lip and can thus be distributed uniformly over a relatively large region of the sealing lip. No friction results here between the elastic shaped part and the first sealing lip so that an additional development of heat is avoided in this region.

The elastic shaped part can be configured in a ring shape with an outer edge region defining the outer periphery and an inner edge region defining the inner periphery. In this case the cavity that can be subjected to the pressure is sealed by the abutment of the inner edge region of the elastic shaped part against the first sealing lip in the direction of the shaft.

However, it is particularly preferred if the elastic shaped part has a first edge region, which abuts against the first face of the spacer ring, a second edge region, which abuts against the second face of the spacer ring and a central region connecting the two edge regions and abutting against the first sealing lip, wherein the cavity is formed between the spacer ring and the central region of the elastic shaped part. In this case, the elastic shaped part has an approximately U-shaped cross-section, wherein the curved central region is directed towards the shaft and defines the inner periphery of the elastic shaped part. This embodiment has the significant advantage that the cavity is hermetically sealed in the direction of the first sealing lip or the shaft by the elastic shaped part and the medium used for the pressure application (typically the medium of the high pressure side) is prevented from discharging.

The contact pressure transferred to the first sealing lip that results at a specific pressure inside the cavity can thus be adapted by means of the size of the area of the central region of the elastic shaped part in such a manner that the pressing of the first sealing lip resulting overall lies in a predetermined optimal range for the respective purpose of use of the radial shaft seal.

The media on the high pressure side and on the low pressure side can be the same or different in the radial shaft seal according to the invention. If the radial shaft seal is used, for example, to seal the shaft on the compressor side of an exhaust gas turbocharger, the medium on the high pressure side is the compressed air charge and the medium on the low pressure side is oil.

The first edge region of the elastic shaped part is preferably held in force-locking manner between the first sealing ring and the first face of the spacer ring. In addition, the elastic shaped part can also be adhered to the first sealing ring and/or to the first face of the spacer ring.

In a further preferred embodiment of the invention, the radial shaft seal additionally comprises a second sealing ring made from a non-elastic plastic material, which is arranged axially displaced relative to the spacer ring in the direction of the low pressure side, wherein in the region of its inner periphery the second sealing ring bulges in the direction of the high pressure side and forms a second sealing lip abutting against the first sealing lip of the first sealing ring. Therefore, in the region of their inner periphery the two sealing rings separated by the spacer ring bulge outwardly in the region of the respective other sealing ring so that the two sealing lips overlap and only the first sealing lip abuts against the shaft. Depending on the dimensioning of the radial shaft seal, the first and the second sealing lip can overlap, for example, along a region of at least 1 mm extending in axial direction. Because two overlapping sealing lips are provided, the elastic shaped part, the central region of which abuts both against the first and against the second sealing lip in this case, is shielded better from the friction heat arising at the shaft than if only one sealing lip is provided.

The second edge region of the elastic shaped part is preferably held in force-locking manner between the second sealing ring and the second face of the spacer ring. As in the case of the first edge region an adhesive connection can also be provided additionally here.

The outer regions of the two sealing rings, i.e., the regions remote from the shaft, are advantageously arranged parallel to one another in planes running perpendicularly to the shaft. However, they can also lie on the generated surface of truncated cones, wherein the sealing rings have the largest spacing from one another along their outer periphery and this spacing decreases radially inwards. The same applies respectively to the first and the second edge region of the elastic shaped part and for the first and the second face of the spacer ring.

The components of the radial shaft seal according to the invention can be arranged directly on the static structural part that receives the shaft and be held by one or more components of this structural part. However, it is greatly preferred if the radial shaft seal additionally comprises a housing, which clamps together the first sealing ring, the spacer ring, the elastic shaped part and optionally the second sealing ring. As a result of such a housing the radial shaft seal forms a compact unit that can be built in more simply and more reliably.

The housing is preferably closed radially outwardly and axially both towards the high pressure and towards the low pressure side. Therefore, the only open region of the housing is the inner periphery of the radial shaft seal, wherein this inner periphery is defined by the first sealing lip abutting against the shaft. The axial side of the housing facing the high pressure side is bent or arched along its inner periphery preferably in the direction of the low pressure side and thus forms a support for the first sealing lip of the first sealing ring. This applies correspondingly to the axial side of the housing facing the low pressure side, which can form a support for the second sealing lip of a possibly provided second sealing ring.

The housing can be formed in a single part or multiple parts, wherein the assembly of the radial shaft seal according to the invention is simplified by a multipart housing. Advantageously, the housing is configured in two parts, wherein a first housing part forms the radial outer surface and one axial side of the housing and a second housing part forms the other axial side. The two housing parts can be connected to one another by a beading, for example, or by other known connection techniques such as welding, screw connection or adhesion.

In particular, the housing can be made from a metal material or a plastic material, wherein metal is preferred. Advantageously, the spacer ring of the radial shaft seal according to the invention is also made from metal, wherein alternatively a plastic material can also be used here.

According to the invention the cavity, which is formed between the spacer ring and the central region of the elastic shaped part, can be subjected to pressure with the pressure prevailing on the high pressure side or with a control pressure. By using a control pressure the pressing of the first sealing lip against the shaft can be adjusted particularly precisely and independently of the pressure prevailing on the high pressure side. However, this embodiment of the invention is associated with a relatively high complexity.

Subjecting the cavity to the pressure prevailing on the high pressure side is substantially simpler to perform and by selection of the surface relationships, as described above, also enables a substantially constant pressing of the first sealing lip with a varying pressure on the high pressure side. Expediently, to subject the cavity to pressure a fluid connection is provided between the high pressure side and the cavity.

This fluid connection preferably comprises at least one hole through the first edge region of the elastic shaped part, through the first sealing ring and through the housing of the radial shaft seal. A plurality of holes can be provided, which are distributed over the periphery of the radial shaft seal, but one hole is sufficient in principle, because the cavity extends continuously along the entire periphery of the radial shaft seal (substantially in the shape of an outwardly flattened torus).

In a preferred embodiment the at least one hole opens in an annular groove of the spacer ring, which is open towards the cavity. Since the annular groove extends along the entire periphery of the spacer ring, after assembly of the radial shaft seal the hole can be provided at any desired location along the periphery.

The non-elastic plastic material, from which the first sealing ring and optionally the second sealing ring are formed, preferably comprises a fluorinated polymer, in particular a homopolymeric PTFE or a TFE copolymer. These fluorinated polymers are distinguished by a low coefficient of friction and a high thermal stability. Compounds of fluorinated polymers with wear-reducing fillers such as e.g. molybdenum sulphide or graphite are particularly preferred in this case. The sealing ring or rings can be produced in the desired shape by a material removal process (e.g., turning), and alternatively this shape (i.e., in particular the bulging of the sealing lip) can also be achieved by a subsequent deformation (stamping). In the latter process an advantageous initial stress of the sealing lip results from the so-called memory effect.

The sealing ring or rings can be clamped with the elastic shaped part and the spacer ring by the housing, i.e., only held in force-locking manner, or can additionally be adhered or vulcanised to one another. When a melt-processable TFE copolymer (such as e.g., PFA or Moldflon®) is used, the sealing rings can also be injection-moulded onto the housing.

The sealing ring or rings preferably have a thickness in the range of approximately 0.2 mm to approximately 1.5 mm.

The elastic shaped part of the radial shaft seal according to the invention is preferably formed from an elastomer, in particular by deforming a sheet material, by injection moulding or by sintering a granular material.

A preferred elastomer in particular is fluororubber, which has a relatively high thermal stability. However, other elastomers can also be used such as e.g. styrene butadiene rubber, silicone rubber or (for injection moulding) thermoplastic elastomers (e.g., polyurethane). The thermal and mechanical stability of the elastic shaped part can also be increased by a fibre reinforcement of the elastomer, for example.

The elastic shaped part preferably has a thickness of approximately 50 µm to approximately 200 µm, the thickness of the shaped part perpendicular to the plane extent thereof being referred to here. As a result of the thickness of the elastic shaped part, but also as a result of the selection of the elastomer, the transfer of the pressure prevailing in the cavity by means of the elastic shaped part to the first sealing lip of the first sealing ring can be adapted in a relatively broad range.

The radial shaft seal according to the invention can be used in different areas that have already been mentioned above, e.g. in turbines, motors or gears. A particular aspect of the invention relates to the use of the radial shaft seal in an exhaust gas turbocharger for an internal combustion engine, in particular on its compressor side.

These and further advantages of the invention are explained in more detail below on the basis of the exemplary embodiments described with reference to the figures.

DETAILED DESCRIPTION OF THE INVENTION

Figure 1:
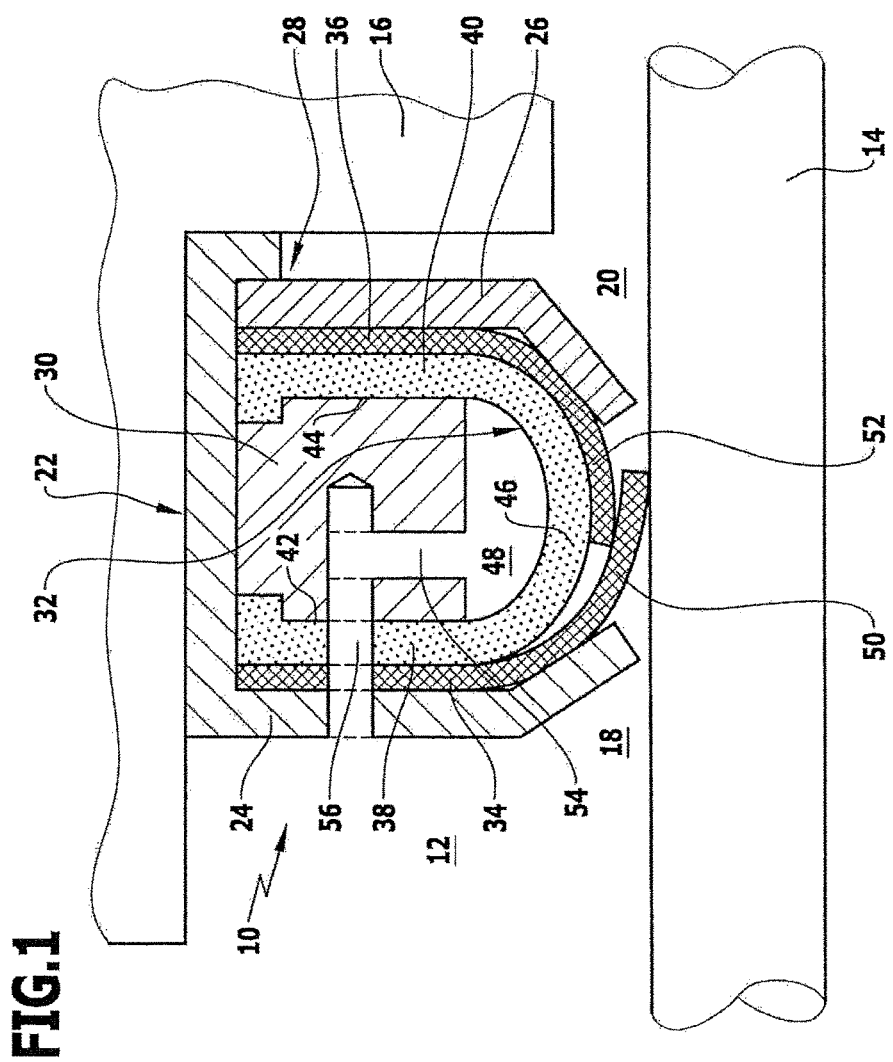
FIG. 1 is a schematic cross-sectional view of a first exemplary embodiment of a radial shaft seal according to the invention.

FIG. 1 schematically shows a radial cross-section through a first exemplary embodiment of a radial shaft seal 10 according to the invention. The radial shaft seal 10 is arranged in an annular space 12 between a shaft 14 and a static structural part 16 receiving the shaft 14 and serves to provide a seal between a high pressure side 18 and a low pressure side 20. The shaft 14 and the static structural part 16 can be parts of an exhaust gas turbocharger, for example.

The radial shaft seal 10 comprises a housing 22 with a first housing part 24 and a second housing part 26, wherein the first housing part 24 forms the radial outer surface and one of the axial sides of the housing 22 and the second housing part 26 forms the other axial side of the housing 22. The housing parts 24 and 26 are connected to another by means of a beading 28.

A spacer ring 30, an elastic shaped part 32, a first sealing ring 34 and a second sealing ring 36 are arranged inside the housing 22, wherein all components of the radial shaft seal 10 are clamped together by the housing 22. The elastic shaped part 32 is formed from an elastomer such as e.g. fluororubber.

The elastic shaped part 32 has a U-shaped cross-section with a first edge region 38, which is held in force-locking manner between the first sealing ring 34 and a first face 42 of the spacer ring 30, a second edge region 40, which is held in force-locking manner between the second sealing ring 36 and a second face 44 of the spacer ring 30, and a curved central region 46, which is oriented in the direction of the shaft 14. A cavity 48, which substantially has the shape of an outwardly flattened torus, is configured between the spacer ring 30 and the central region 46 of the elastic shaped part 32.

In the region of its inner periphery the first sealing ring 34 bulges in the direction of the low pressure side 20 and forms a first sealing lip 50 abutting against the shaft 14. The contact surface between the first sealing lip 50 and the shaft 14 constitutes the only dynamic sealing surface in the radial shaft seal 10. In the region of its inner periphery the second sealing ring 36 bulges in the direction of the high pressure side 18 and forms a second sealing lip 52, which abuts against the first sealing lip 50 of the first sealing ring 34 and overlaps with this.

The first sealing ring 34 and the second sealing ring 36 are formed from a non-elastic plastic material, e.g. from PTFE or a TFE copolymer or a corresponding compound. The sealing rings 34 and 36 can be produced by material removal, by deformation or by injection moulding.

The spacer ring 30 has an annular groove 54 open towards the cavity 48. A hole 56 through the first housing part 24, the first sealing ring 34 and the first edge region 38 of the elastic shaped part 32 opens in this annular groove 54 and forms a fluid connection between the high pressure side 18 and the cavity 48, so that the cavity 48 can be subjected to the pressure prevailing on the high pressure side 18. This pressure is transferred to the first sealing lip 50 by means of the central region 46 of the elastic shaped part 32 and also by means of the second sealing lip 52, so that the first sealing lip 50 is pressed against the shaft 14 with a force that constitutes a counter-force to the pressure of the high pressure side 18 present between the first sealing lip 50 and the shaft 14. As a result of this pressure equalisation, a substantially constant pressing against the dynamic sealing surface can be maintained substantially independently of the pressure difference between the high pressure side 18 and the low pressure side 20 with a relatively low uniform friction.

By preventing excessive friction heat by the first sealing lip 50 being pressed too strongly against the shaft 14, and also as a result of the thermal shielding of the elastic shaped part 32 by the two sealing lips 50 and 52, thermal damage of the individual components can be significantly reduced, so that the radial shaft seal 10 has a very high wear-resistance overall.

Figure 2:
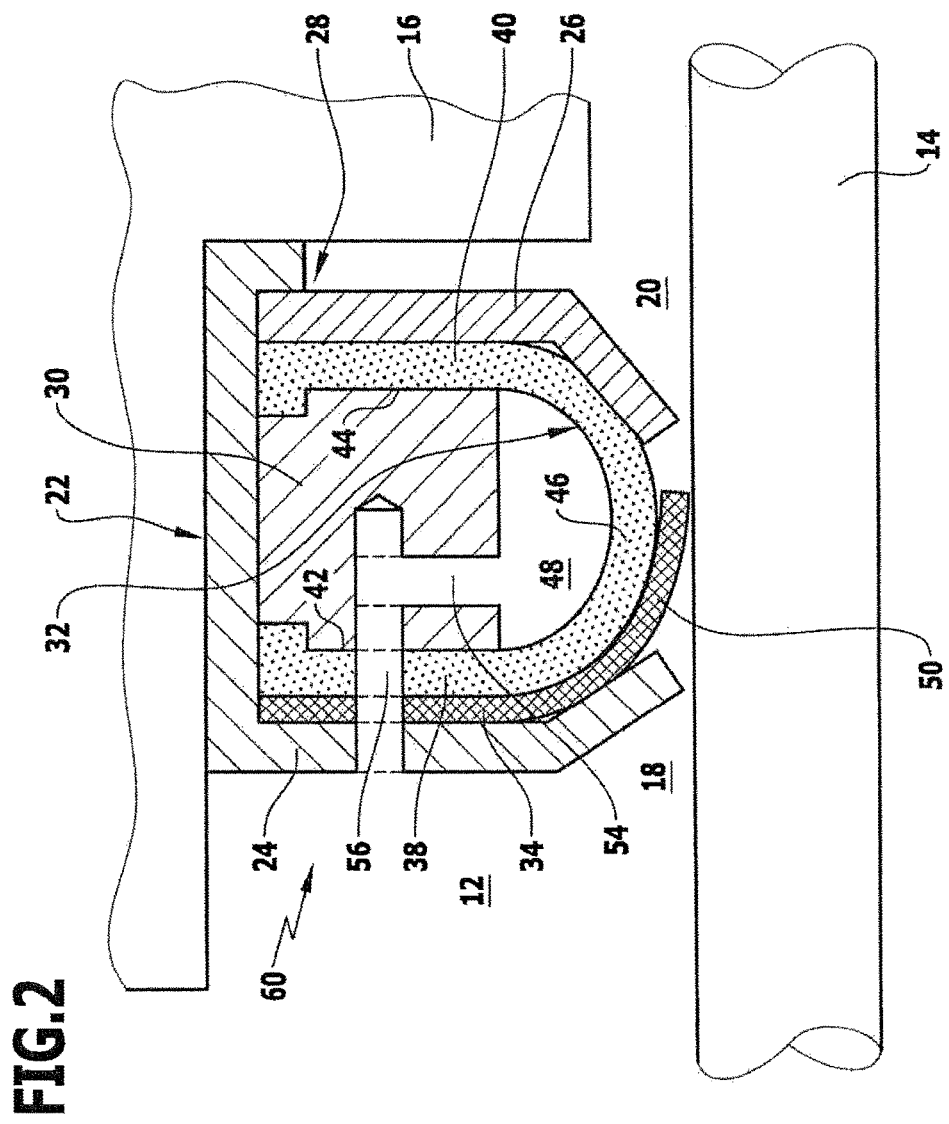
FIG. 2 is a schematic cross-sectional view of a second exemplary embodiment of a radial shaft seal according to the invention.

FIG. 2 schematically shows a radial cross-section through a second exemplary embodiment of a radial shaft seal 60 according to the invention. Except for the differences described below, the structure of the radial shaft seal 60 corresponds to the first exemplary embodiment according to FIG. 1, wherein the same or corresponding elements are respectively provided with the same references.

The radial shaft seal 60 only comprises a single sealing ring 34 with a sealing lip 50. Because of the absence of a second sealing ring, the second edge region 40 of the elastic shaped part 32 is held in force-locking manner directly between the spacer ring 30 and the second housing part 26.

In this case, the central region 46 of the elastic shaped part 32 abuts directly against the sealing lip 50 substantially along the entire sealing lip without a second sealing lip being located therebetween.

The cavity 48 is subjected to pressure with the pressure of the high pressure side 18 via the hole 56 and the force is transferred to the sealing lip 50 according to the same principle as in the first exemplary embodiment according to FIG. 1. However, the thermal shielding of the elastic shaped part 32 is slightly less because of the absence of a second sealing lip.

Figure 3:
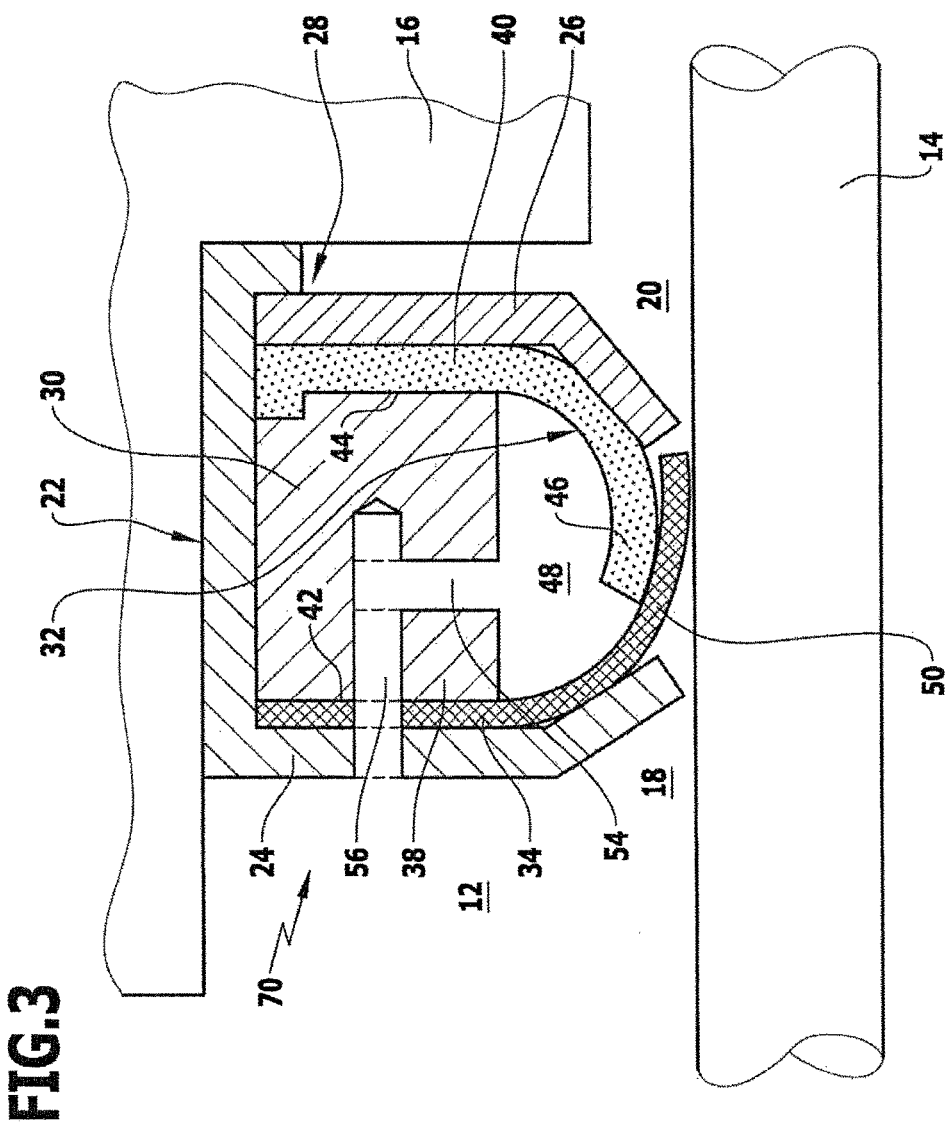
FIG. 3 is a schematic cross-sectional view of a third exemplary embodiment of a radial shaft seal according to the invention.

FIG. 3 shows a radial cross-section through a third exemplary embodiment of a radial shaft seal 70 according to the invention. Except for the differences described below, its structure corresponds to the second exemplary embodiment according to FIG. 2, wherein the same or corresponding elements are respectively provided with the same references.

The elastic shaped part 32 in the radial shaft seal 70 does not have a U-shaped cross-section, but is substantially ring-shaped in configuration with an outer edge region 40, which corresponds to the second edge region 40 according to the first two exemplary embodiments and is held in force-locking manner between the spacer ring 30 and the second housing part 26, and an inner edge region 46, which bulges in the direction of the high pressure side 18 and abuts against the first sealing lip 50 of the first sealing ring 34.

The cavity 48, which can be subjected to pressure via the hole 56 with the pressure prevailing on the high pressure side 18, in the radial shaft seal 70 is delimited on one side by the spacer ring 30 and on the other side by the inner edge region 46 and the first sealing lip 50 that abut against one another. The sealing of the cavity 48 in the direction of the shaft 14 is effected by the inner edge region 46 of the elastic shaped part 32 being pressed against the first sealing lip 50 by the pressure application.

LIST OF REFERENCE NUMBERS

10 radial shaft seal
12 annular space
14 shaft
16 static structural part
18 high pressure side
20 low pressure side
22 housing
24 first housing part
26 second housing part
28 beading
30 spacer ring
32 elastic shaped part
34 first sealing ring
36 second sealing ring
38 first edge region
40 second edge region
42 first face
44 second face
46 central region
48 cavity
50 first sealing lip
52 second sealing lip
54 annular groove
56 hole
60 radial shaft seal
70 radial shaft seal

What is claimed is:

1. A radial shaft seal for sealing between a high pressure side and a low pressure side in an annular space between a shaft and a static structural part receiving the shaft, wherein the radial shaft seal is configured to be rotationally symmetric and is arranged coaxially to the shaft, comprising
    (i) a first sealing ring made from a non-elastic plastic material comprising a fluorinated polymer, which extends in the direction of the low pressure side from a first end to a second end, wherein there is a continuous smooth transition from a substantially radial orientation of the first end into a substantially axial orientation of the second end of the first sealing ring, the second end forming a first sealing lip abutting against the shaft with an initial stress resulting from a memory effect of the plastic material,
    (ii) a spacer ring, which is arranged axially displaced relative to the first sealing ring in the direction of the low pressure side, with a first face directed towards the high pressure side and a second face directed towards the low pressure side, and
    (iii) an elastic shaped part, which extends in the direction of the high pressure side from a first end having a surface abutting against the second face of the spacer ring to a second portion having a first opposing surface facing toward the first sealing lip and a second opposing surface facing away from the first sealing lip,
    wherein between the spacer ring, the elastic shaped part and optionally the first sealing lip there is formed a cavity, which is subjected to the pressure prevailing on the shaft seal's high pressure side in the direction of which the elastic shaped part extends, in such a manner that as a result of said pressure application the first sealing lip is pressed against the shaft by means of the pressure applied to the second opposing surface of the elastic shaped part, and the opposing pressure of the high pressure side prevailing between the first sealing lip and the shaft being equalized.

2. The radial shaft seal according to claim 1, wherein the elastic shaped part has a first edge region, which abuts against the first face of the spacer ring, a second edge region, which abuts against the second face of the spacer ring, and a central region connecting the two edge regions and abutting against the first sealing lip, and wherein the cavity is formed between the spacer ring and the central region of the elastic shaped part.

3. The radial shaft seal according to claim 2, wherein the first edge region of the elastic shaped part is held in a force-locking manner between the first sealing ring and the first face of the spacer ring.

4. The radial shaft seal according to claim 2, further comprising a second sealing ring made from the non-elastic plastic material, which is arranged axially displaced relative to the spacer ring in the direction of the low pressure side, wherein in the region of its inner periphery the second sealing ring bulges in the direction of the high pressure side and forms a second sealing lip abutting against the first sealing lip of the first sealing ring.

5. The radial shaft seal according to claim 4, wherein the first and the second sealing lips overlap along a region of at least 1 mm extending in axial direction.

6. The radial shaft seal according to claim 4, wherein the second edge region of the elastic shaped part is held in a force-locking manner between the second sealing ring and the second face of the spacer ring.

7. The radial shaft seal according to claim 1, further comprising a housing, which clamps together the first sealing ring, the spacer ring, the elastic shaped part and optionally the second sealing ring.

8. The radial shaft seal according to claim 7, wherein the housing is closed radially outwardly and axially both towards the high pressure side and towards the low pressure side.

9. The radial shaft seal according to claim 7, wherein the housing is configured in a single part or multiple parts.

10. The radial shaft seal according to claim 1, wherein a fluid connection is provided between the high pressure side and the cavity in order to subject the cavity to pressure.

11. The radial shaft seal according to claim 10, wherein the fluid connection comprises at least one hole through the first edge region of the elastic shaped part, through the first sealing ring and through the housing.

12. The radial shaft seal according to claim 11, wherein the at least one hole opens in an annular groove of the spacer ring, which is open towards the cavity.

13. The radial shaft seal according to claim 1, wherein the fluorinated polymer comprises a homopolymeric PTFE, a TFE copolymer or compounds thereof.

14. The radial shaft seal according to claim 1, wherein the sealing ring or rings have a thickness in the range of approximately 0.2 mm to approximately 1.5 mm.

15. The radial shaft seal according to claim 1, wherein the elastic shaped part is formed from an elastomer.

16. The radial shaft seal according to claim 15, wherein the elastic shaped part is made by deforming a sheet material, by injection moulding or by sintering a granular material.

17. The radial shaft seal according to claim 1, wherein the elastic shaped part has a thickness of approximately 50 μm to approximately 200 μm.

18. An exhaust gas turbocharger for an internal combustion engine, comprising the radial shaft seal according to claim 1.

19. The exhaust gas turbocharger according to claim 18, wherein the radial shaft seal is arranged on the compressor side of the turbocharger.

* * * * *